UNITED STATES PATENT OFFICE.

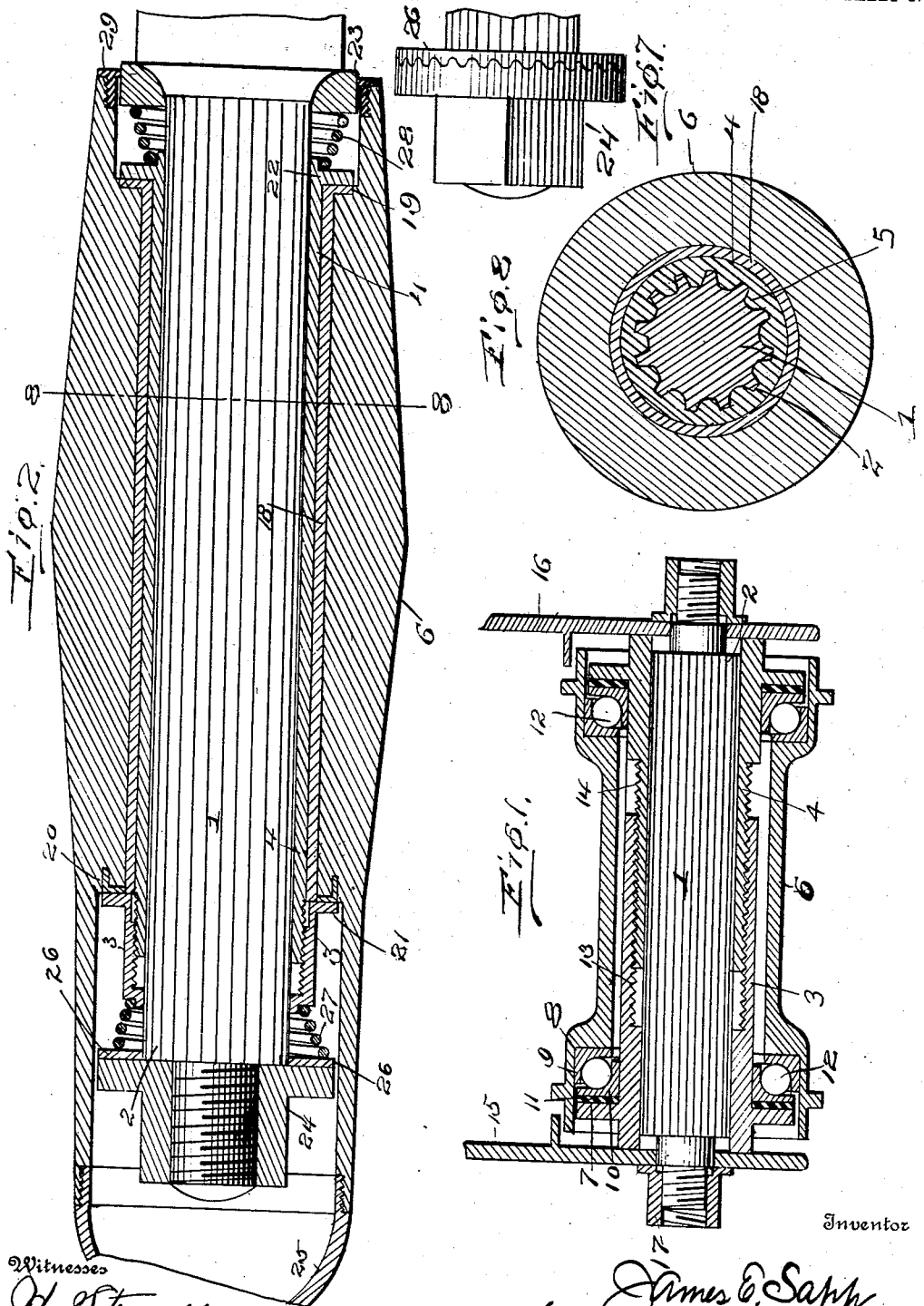

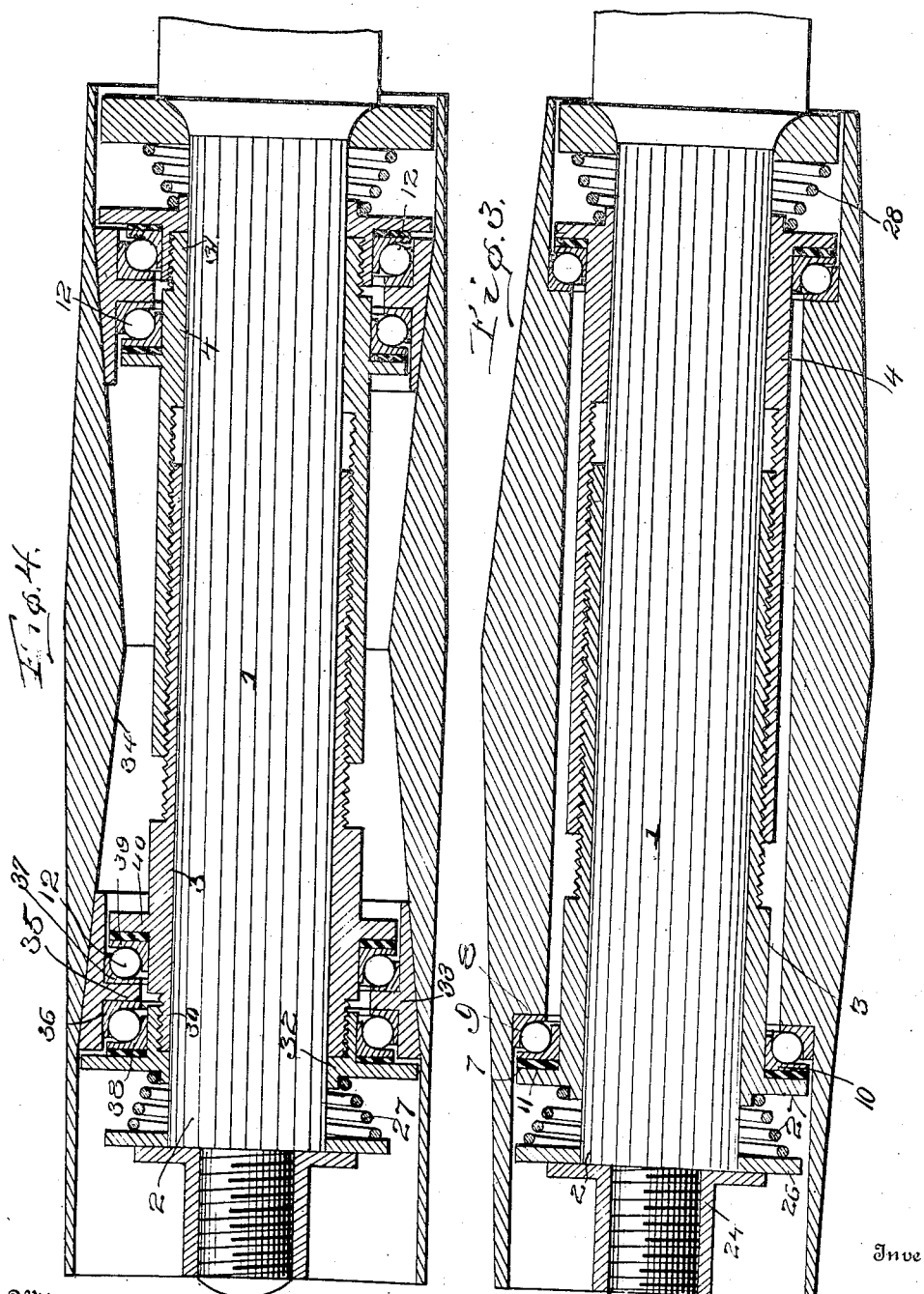

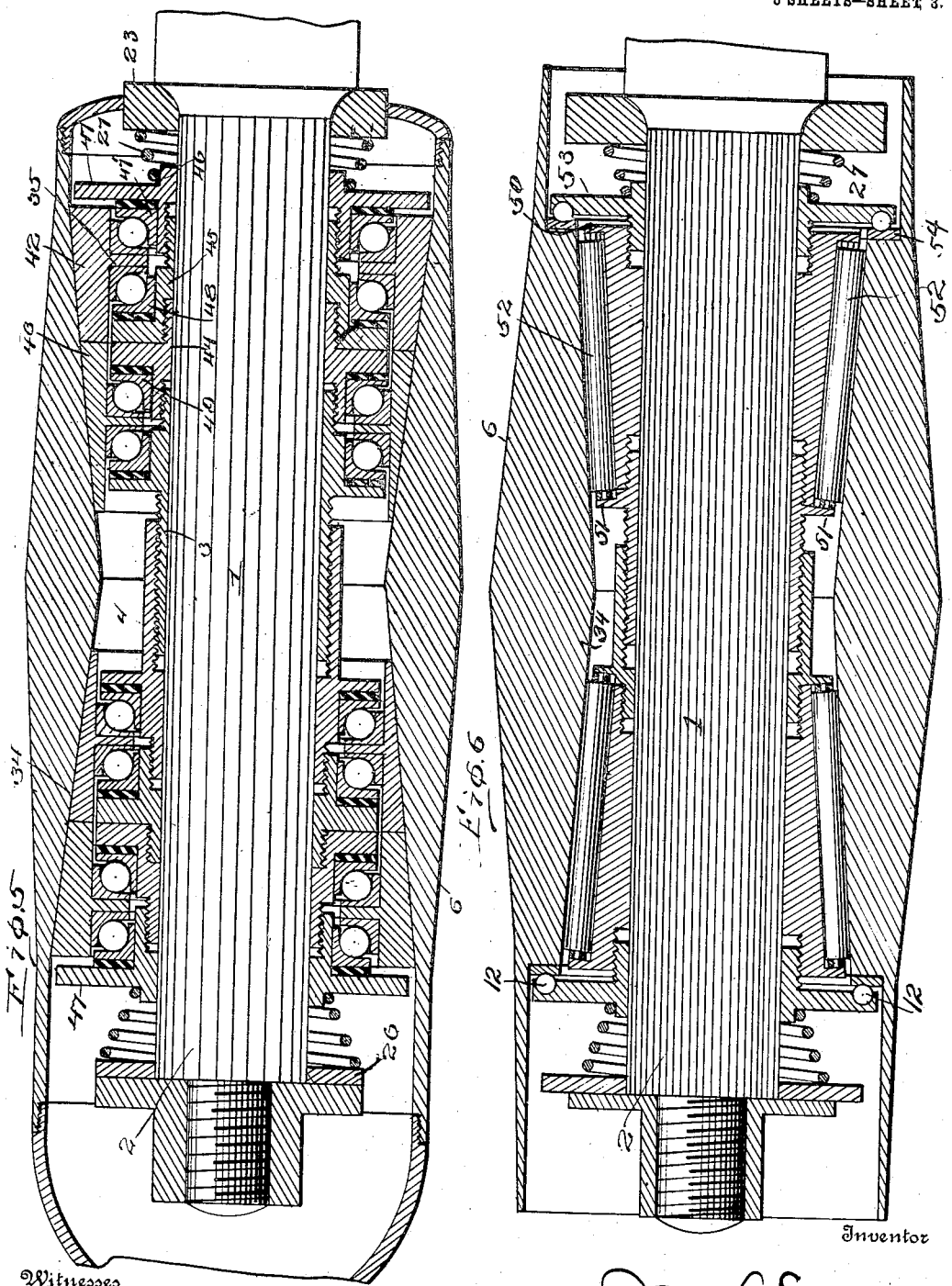

JAMES E. SAPP, OF BAINBRIDGE, GEORGIA.

BEARING.

958,548. Specification of Letters Patent. Patented May 17, 1910.

Application filed February 2, 1909. Serial No. 475,658.

*To all whom it may concern:*

Be it known that I, JAMES E. SAPP, a citizen of the United States, residing at Bainbridge, in the county of Decatur and State of Georgia, have invented certain new and useful Improvements in Bearings; and I do hereby declare the following to be a full, clear, and exact description of the invention, such as will enable others skilled in the art to which it appertains to make and use the same.

This invention relates to bearings.

The object of the invention is to provide a device which may be used as a bearing for the axles of a bicycle, automobile, wagon or other vehicle, or which may be employed as a bearing for the shaft of a machine of any description.

A further object is to provide a bearing which may be readily adjusted in order to take up the wear from time to time, and which when used on the hub of a vehicle will permit the movement of said hub longitudinally of the axle to a limited degree, thereby relieving strains caused by jolts resulting from an uneven roadbed; to provide for the taking up of such strains by means of a resilient device located between the hub and the axle or parts secured to the axle, and to provide a sufficient number of points of adjustment so that when a plurality of ball or roller bearings are used on a single hub each of these bearings may be accurately adjusted and to a corresponding degree.

With these and other objects in view the invention consists in the novel construction hereinafter described and claimed.

In the drawings: Figure 1 represents a longitudinal sectional view of a hub of a bicycle wheel, the axle on which said hub is mounted being shown in elevation. Fig. 2 is a similar view of a hub and axle designed for use on a larger vehicle. Fig. 3 is a similar view of a hub and axle, such hub being provided with a ball bearing near either end. Figs. 4 and 5 are also longitudinal sections of hubs provided with my improved device, a plurality of ball bearings being provided at either end of the hub. Fig. 6 is a similar view of a hub provided with a bearing of the same general character as those illustrated in the other figures, but provided with roller bearings in addition to ball bearings. Fig. 7 is a view in side elevation of a nut at the outer end of the axle, with a spring-pressed locking plate contacting therewith. Fig. 8 is a section on the line 8—8 of Fig. 2.

Referring to the drawings in detail, and especially to Fig. 1 thereof, the numeral 1 indicates the axle of a vehicle, the construction here shown being especially designed for use on a bicycle. The axle 1 is provided on its periphery with a number of longitudinal ribs 2, and tubular members 3 and 4 surrounding such axle are provided with internally projecting devices 5 arranged to engage the ribs on the axle 1 in order that such members may be held in a given position against revolution. The numeral 6 indicates the hub proper to which the spokes are affixed. Each tubular member is provided with an outwardly extending flange 7 near its outer end, and the hub 6 is formed with an annular recess 8 of a depth substantially corresponding with the depth of flange 7. A collar 9 is located in the recess last mentioned, and a corresponding collar 10 surrounds each tubular member at a point adjacent to the flange 7, but is separated from the latter by means of a rubber washer 11. Ball bearings 12 are located between the collars. Tubular members 3 and 4 are provided with threaded portions 13 and 14, the former being upon the interior of member 3 and the latter upon the exterior of member 4, and formed with right and left hand threads respectively. The threaded portions 13 and 14 are formed upon reduced portions of members 3 and 4, as shown. The forks of the bicycle are indicated by 15 and 16, and the nuts secured to the ends of the axle by 17.

In adjusting the parts of the device shown in Fig. 1, the tubular members 3 and 4 are screwed together until the flanges 7 are in the correct position with reference to the ball bearings, and the axle is then placed in position, the ribs 2 thereof engaging the devices 5, and the resilient devices holding such members permanently in position until a further adjustment is rendered desirable on account of wear.

The construction illustrated in Fig. 2 is similar in principle, but the bearing here shown is designed for use in connection with a larger vehicle. In this figure the axle is again represented by 1, the longitudinal ribs thereon by 2, and the tubular members by 3 and 4, respectively. The hub proper, indicated by 6, is provided with the usual box 18 having an outwardly extending flange 19, and a flange ring 20 is located in the hub at the end of the box 18 opposite to such flange 19. Members 3 and 4 are provided, respectively, on their ends with flanges 21 and 22 the former of which contacts with flanged ring 20 and the latter of which contacts with flange 19. The tubular member 3 is provided with an internal screw thread and the tubular member 4 with an external screw thread engaging the threads first-mentioned. These tubular members are also provided with devices 5 for engaging the ribs 2 of the axle, this construction corresponding to that shown in Fig. 8. A collar 23 surrounds the axle at the extreme end of that portion located within the bearing, and a nut 24 is secured to the outer end of the axle, the hub 6 being provided with a cap 25 which prevents dust from coming into contact with the bearing. Between the end of tubular member 3 and the flanged portion of nut 24 is a nut plate 26 provided with ribs, as shown in Fig. 7, engaging corresponding ribs on the flanged portion of the nut. A spring 27 is located between plate 26 and the end of tubular member 3, and a similar spring 28 is located between collar 23 and flange 22 of tubular member 4. These springs serve to form a resilient connection between the axle and the hub so that the latter may be moved to a limited degree longitudinally of the axle and thereby take up lateral strains resulting from an uneven roadbed. A flanged collar 29 is connected with the inner end of the hub and surrounds collar 23, thereby excluding dust and dirt from the inner end of the axle.

The construction illustrated in Fig. 2 is adjusted for the purpose of taking up wear by screwing members 3 and 4 together until the flanges 21 and 22 are in such position that they will contact with flanges 20 and 19, respectively. The hub containing these members thus adjusted is then placed on the axle, the longitudinal ribs engaging the devices 5 projecting inwardly and thereby securely holding the various parts permanently in position until further adjustment is required.

In Fig. 3 the tubular members 3 and 4 are connected by screw threads in the manner already described, and are provided with devices similar to those shown in Fig. 8 for engaging the longitudinal ribs of the axle 1. In this construction ball bearings are provided, such bearings being located between collars 9 and 10, the former of which rests in an annular recess 8 formed in the hub and the latter of which bears against a rubber washer 11 resting on flange 7 of member 3. Springs 27 and 28 surround the axle at either end of that portion located within the bearing and serve the same purpose as in the device illustrated in Fig. 2.

A nut plate 26 provided with ribs engaging the ribs on the flanged portion of nut 24 is also employed.

In Fig. 4 I have illustrated a construction in which a plurality of ball bearings are located near either end of the hub. In this case, tubular members 3 and 4 having a threaded connection with each other at their ends are provided also with threaded portions 30 and 31 on their outer ends, such threaded portions engaging corresponding threads on flanged collars 32. Annular members 33 are located within the hub and are provided with tapering outer surfaces corresponding with the inclined wall 34 of the hub. These tubular members 33 carry inwardly extending flanges 35, the latter supporting on either face thereof collars 36 and 37 for the accommodation of bearing balls 12. Similar collars 38 and 39 are located, respectively, in contact with washers adjoining collars 32 and 40. The remainder of the construction corresponds with that previously described. It will be understood that members 33 are designed to be brought into such close contact with the wall 34 of the hub that they will rotate with the latter and that the threaded portions of members 3 and 4 and collars 32 are adjusted in such manner that these members will assume their proper relation, which relation is maintained by the engagement of these members with the longitudinal ribs on the axle.

In Fig. 5, four ball bearings are used at each end of the hub, the latter having inclined walls 34 as in the device shown in Fig. 4, such walls being engaged by collars 42 and 43 located adjacent to each other, two being provided at each end of the hub. These collars have inwardly projecting flanges 35 supporting collars for the ball bearings, as above described in connection with the other figures. In this case the tubular members 3 and 4 are considerably shorter than those employed where a less number of bearing balls are used, and a plurality of collars 44, 45 and 46 having threaded connections surround the axle and are located in proximity to members 3 and 4. The collar 46 has a flange 47 projecting over the outer end of member 42 and engaging a spring 27 surrounding the axle and bearing against collar 23 also mounted on the axle. A similar spring is located in the opposite end of axle 1 and bears against nut plate 26. It will be understood that collars 44, 45 and 46 carrying collars 49, 48 and 47' for the bearing balls, may each be adjusted for the purpose of taking up wear in the usual manner and that tubular members 3 and 4 may be adjusted relative to each other.

In Fig. 6 I have shown a construction in which the tubular members 3 and 4 and the collars connected thereto are each provided with flanges 51 and 50 respectively, in which rollers 52 may be mounted, such rollers bearing against the inclined surfaces 34 of the hub 6. Each tubular member is threaded internally at its outer end and engages a threaded portion of a collar 53 against which spring 27 is arranged to bear. The bearing balls 12 are located between the inner faces of collars 53, and the collars 54 bearing against the hub. The manner of adjusting the device shown in Fig. 6 will be apparent after reading the description above of the other figures.

It will be noted that the springs designed for taking up strains longitudinally of the axle bear on portions which do not revolve and that such springs cannot, therefore, add in any manner to the friction between the moving parts.

What I claim as new and desire to secure by Letters Patent is:

1. In a bearing, a plurality of tubular members adjustable with reference to each other, engaging devices thereon, an axle provided with corresponding engaging devices, bearings for the tubular members, and resilient devices for flexibly supporting the tubular members against movement longitudinally of the axle.

2. In a bearing, a plurality of tubular members having screw-threaded connection, engaging devices therein, an axle provided with corresponding engaging devices, means for mounting the tubular members, and resilient devices for flexibly supporting the tubular members against movement longitudinally of the axle.

3. In a bearing, a plurality of tubular members adjustable with reference to each other, engaging devices thereon, an axle, longitudinal ribs thereon for contacting with the engaging devices, means for rotatably mounting a hub on the tubular members, and resilient devices for flexibly supporting the tubular members against movement longitudinally of the axle.

4. In a bearing, a plurality of tubular members adjustable with reference to each other, engaging devices on said members, an axle provided with corresponding engaging devices, means for mounting the tubular members, a resilient device arranged to contact with one end of such members, a collar surrounding the axle and provided with engaging devices and contacting with the resilient device, and a nut also provided with engaging devices and contacting with said collar.

5. In a bearing, a plurality of tubular members adjustable with reference to each other, an axle provided with means for engaging such tubular members and preventing the rotation thereof with reference to the axle, a collar surrounding the axle and having threaded connection with the outer end of each of the tubular members, means for rotatably mounting a hub on said collar and on said tubular members, and means bearing against the collar for cushioning the latter with reference to the axle.

6. In a bearing, a plurality of tubular members adjustably connected, engaging devices thereon, an axle, longitudinal ribs thereon contacting with the engaging devices on the tubular members, collars adjustably connected with the tubular members, annular devices arranged to be supported in the bearing, means for rotatably supporting the tubular members and collar within such annular members, and springs surrounding the axle and bearing against the collars.

In testimony whereof I affix my signature in presence of two witnesses.

JAMES E. SAPP.

Witnesses:
B. F. LEWIS,
G. B. GOHOON.